(12) United States Patent
Nishimoto et al.

(10) Patent No.: US 12,212,405 B2
(45) Date of Patent: Jan. 28, 2025

(54) TRANSMISSION DEVICE MANAGEMENT DEVICE, TRANSMISSION DEVICE MANAGEMENT SYSTEM, TRANSMISSION DEVICE MANAGEMENT METHOD AND PROGRAM

(71) Applicant: Nippon Telegraph and Telephone Corporation, Tokyo (JP)

(72) Inventors: Keita Nishimoto, Musashino (JP); Kota Asaka, Musashino (JP); Junichi Kani, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 81 days.

(21) Appl. No.: 18/015,849

(22) PCT Filed: Jul. 17, 2020

(86) PCT No.: PCT/JP2020/027843
§ 371 (c)(1),
(2) Date: Jan. 12, 2023

(87) PCT Pub. No.: WO2022/014041
PCT Pub. Date: Jan. 20, 2022

(65) Prior Publication Data
US 2023/0261778 A1 Aug. 17, 2023

(51) Int. Cl.
*H04J 14/02* (2006.01)
(52) U.S. Cl.
CPC .................. *H04J 14/021* (2013.01)
(58) Field of Classification Search
CPC .............................. H04J 14/021; H04L 12/12
USPC .............................................................. 398/48
See application file for complete search history.

(56) References Cited

U.S. PATENT DOCUMENTS

| | | | | |
|---|---|---|---|---|
| 9,780,909 | B2 * | 10/2017 | Wood | H04J 14/0267 |
| 10,263,848 | B2 * | 4/2019 | Wolting | H04L 67/1097 |
| 2012/0327941 | A1 * | 12/2012 | Villamizar | H04L 47/41 |
| | | | | 370/394 |
| 2015/0029846 | A1 * | 1/2015 | Liou | H04L 45/64 |
| | | | | 370/230.1 |
| 2016/0173338 | A1 * | 6/2016 | Wolting | H04L 41/12 |
| | | | | 709/223 |

(Continued)

OTHER PUBLICATIONS

Liu et al., "Field Trial of an OpenFlow-Based Unified Control Plane for Multilayer Multigranularity Optical Switching Networks," Journal of Lightwave Technology, 2013, 31(4):506-514.

(Continued)

*Primary Examiner* — Abbas H Alagheband
(74) *Attorney, Agent, or Firm* — Fish & Richardson P.C.

(57) ABSTRACT

A transmitter management device includes: a reception unit that receives a virtual switch configuration request from an upper management system; a determination unit that determines a plurality of paths including transfer processing by different optical transmitters on the basis of the configuration request received by the reception unit; and a setting unit that performs a setting for a plurality of the optical transmitters in such a way that a virtual switch that executes transfer processing on the basis of the paths determined by the determination unit is configured for each one of a plurality of the paths.

7 Claims, 7 Drawing Sheets

(56) References Cited

U.S. PATENT DOCUMENTS

2016/0182355 A1* 6/2016 Traxler ............... H04L 45/122
370/359
2016/0191194 A1* 6/2016 Wood ............... H04J 14/0267
398/58

OTHER PUBLICATIONS

Yamashita et al., "Extension of OpenFlow Protocol to Support Optical Transport Network, and Its Implementation," IEEE Conference on Standards for Communications and Networking (CSCN), Oct. 28, 2015, pp. 263-268.

* cited by examiner

TRANSMISSION DEVICE MANAGEMENT DEVICE, TRANSMISSION DEVICE MANAGEMENT SYSTEM, TRANSMISSION DEVICE MANAGEMENT METHOD AND PROGRAM

TECHNICAL FIELD

The present invention relates to a transmitter management device, a transmitter management system, a transmitter management method, and a program.

BACKGROUND ART

Network virtualization technologies have recently been introduced. For example, application of software defined networking (SDN) to an access network has been studied. The SDN is a technology for centrally controlling network equipment with a single piece of software. In the SDN, a transfer function and a control function in a network are separated into a data plane and a control plane, respectively. In the SDN, the control function implemented by software is arranged in a cloud or the like on the control plane so that communication equipment on the data plane is controlled. Applying the SDN to an access network makes it possible to flexibly change the configuration of the access network, and an improvement in efficiency of network operation is expected.

In addition, a method of controlling an optical transmitter with the use of an SDN protocol such as OpenFlow (hereinafter also referred to as "OF") in a similar manner to packet switching or the like has recently been studied. Packet switching is a technology for transferring optical packet signals as they are at high speed on a packet-by-packet basis. For example, Non Patent Literature 1 proposes a method of abstracting an optical transmitter such as a reconfigurable optical add/drop multiplexer (ROADM) as a virtual OpenFlow switch (OF-ROADM) (FIG. 5). The ROADM is a technology for efficiently operating an ultra-high-speed and large-capacity transmission network with a combination of wavelength division multiplexing and a path management technology. In addition, for example, Non Patent Literature 2 proposes a multilayer integrated management technique in which an optical transmitter and a packet switch are managed in an integrated manner (FIG. 6).

CITATION LIST

Non Patent Literature

Non Patent Literature 1: L. Liu et al., "Field Trial of an OpenFlow-Based Unified Control Plane for Multilayer Multigranularity Optical Switching Networks," Journal of Lightwave Technology, Vol. 31, No. 4, pp. 506-514, Feb. 15, 2013.
Non Patent Literature 2: S. Yamashita et al., "Extension of OpenFlow Protocol to Support Optical Transport Network, and Its Implementation," IEEE Conference on Standards for Communications and Networking (CSCN), pp. 263-268, 2015.

SUMMARY OF INVENTION

Technical Problem

For example, in a layer 0/1 device and a layer 2-4 device connected to a network, there may be a plurality of multilayer paths having different performances or functions. The performances here are, for example, a delay amount, power consumption, or throughput in the optical transmitter. For example, when the layer 0/1 device (e.g., an optical transmitter such as a ROADM) receives a signal, there may be two multilayer paths as illustrated in FIG. 7. One of the paths is used when the layer 0/1 device transfers a received signal to the layer 2-4 device. The other path is used when transfer processing is performed by the layer 0/1 device alone, without the layer 0/1 device transferring a received signal to the layer 2-4 device.

In a case of the former path used when a signal is transferred to the layer 2-4 device, it is possible to flexibly perform transfer processing, such as adding processing of rewriting a part of the signal. However, in the case of the former path, a decrease in performance (e.g., an increase in delay amount or power consumption in the optical transmitter) occurs when a signal is transferred to the layer 2-4 device. On the other hand, in a case of the latter path used when transfer processing is performed by the layer 0/1 device alone, a signal is not transferred to the layer 2-4 device, and this allows for low-delay and power-saving transfer processing. However, in the case of the latter path, it is not possible to flexibly perform transfer processing, such as adding processing of rewriting a part of a signal.

In a case where there is a plurality of multilayer paths as described above, in the technology described in Non Patent Literature 1 described above, management is performed independently for each layer, and thus it is not possible to manage each path as an independent path. In addition, in a case where there is a plurality of multilayer paths as described above, in the technology described in Non Patent Literature 2, different paths are abstracted as one virtual switch, and thus it is not possible to manage each path as an independent path.

As described above, the conventional technologies do not allow each path of multilayers to be managed as an independent path, and have a problem in that it is difficult to flexibly manage paths, such as managing the paths so that the performance and function an operator expects are guaranteed.

In view of the above circumstances, it is an object of the present invention to provide a transmitter management device, a transmitter management system, a transmitter management method, and a program capable of flexibly managing multilayer paths in an optical transmitter.

Solution to Problem

One aspect of the present invention provides a transmitter management device including: a reception unit that receives a virtual switch configuration request from an upper management system; a determination unit that determines a plurality of paths including transfer processing by different optical transmitters on the basis of the configuration request received by the reception unit; and a setting unit that performs a setting for a plurality of the optical transmitters in such a way that a virtual switch that executes transfer processing on the basis of the paths determined by the determination unit is configured for each of the paths.

One aspect of the present invention provides a transmitter management system including a plurality of optical transmitters and a transmitter management device, the transmitter management device including: a reception unit that receives a virtual switch configuration request from an upper management system; a determination unit that determines a plurality of paths including transfer processing by the different optical transmitters on the basis of the configuration request received by the reception unit; and a setting unit that performs a setting for a plurality of the optical transmitters in such a way that a virtual switch that executes transfer processing on the basis of the paths determined by the determination unit is configured for each of the paths.

One aspect of the present invention provides a transmitter management method including: a reception step of receiving a virtual switch configuration request from an upper management system; a determination step of determining a plurality of paths including transfer processing by different optical transmitters on the basis of the configuration request received in the reception step; and a setting step of performing a setting for a plurality of the optical transmitters in such a way that a virtual switch that executes transfer processing on the basis of the paths determined in the determination step is configured for each of the paths.

One aspect of the present invention provides a program for causing a computer to function as the transmitter management device described above.

Advantageous Effects of Invention

The present invention enables flexible management of multilayer paths in an optical transmitter.

DESCRIPTION OF EMBODIMENTS

Embodiments of the present invention will be described below in detail with reference to the drawings.

First Embodiment

Hereinafter, a first embodiment of the present invention will be described.

[Basic Configuration of Transmitter Management System]

A basic configuration of a transmitter management system 1 according to the present embodiment will be described below.

Figure 1:
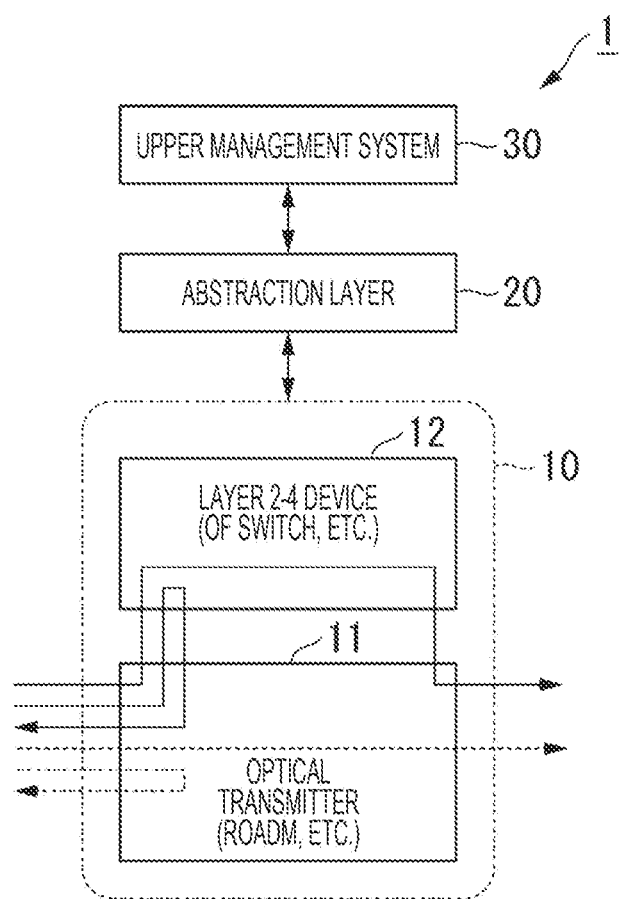
FIG. 1 is an overall schematic diagram illustrating a basic configuration of a transmitter management system 1 according to a first embodiment of the present invention.

FIG. 1 is an overall schematic diagram illustrating a basic configuration of the transmitter management system 1 according to the first embodiment of the present invention.

As illustrated in FIG. 1, the transmitter management system 1 according to the present embodiment includes a communication device group 10, an abstraction layer 20, and an upper management system 30.

The communication device group 10 includes an optical transmitter 11 and a layer 2-4 device 12.

The optical transmitter 11 is a communication device corresponding to layers 0 and 1 (hereinafter referred to as a "layer 0/1 device"). For example, the optical transmitter 11 is an optical transmitter such as a ROADM.

The layer 2-4 device 12 is a communication device corresponding to layers 2 to 4. For example, the layer 2-4 device 12 is an OpenFlow-enabled switch (OF switch).

The abstraction layer 20 is constituted by, for example, a server device. The abstraction layer 20 sets, as a resource pool, the communication device group 10 including the layer 2-4 device 12 and the optical transmitter 11 as a layer 0/1 device. The resource pool is a mechanism in which a plurality of resources (resources of an access network in the present embodiment) of the same type such as a virtual server, a storage, or a network is grouped and managed as one large resource. The abstraction layer is means for hiding details regarding implementation of a specific function.

The upper management system 30 includes, for example, a server device. The upper management system 30 generates a virtual switch configuration request, which is information including configuration requirements of a virtual switch (hereinafter referred to as a "virtual switch"). The upper management system 30 transmits the generated virtual switch configuration request to the abstraction layer 20.

Note that the upper management system 30 may make an inquiry about an already configured virtual switch to the abstraction layer 20 before generating a virtual switch configuration request. In this case, the upper management system 30 generates a virtual switch configuration request in consideration of contents of a response from the abstraction layer 20 to the inquiry.

The abstraction layer 20 acquires the virtual switch configuration request from the upper management system 30. A virtual switch based on the configuration request from the upper management system 30 is configured with the use of a resource pool in which the communication device group 10 has been abstracted. The abstraction layer 20 provides the upper management system 30 with the configured virtual switch as a management target.

With such a configuration, the transmitter management system 1 according to the first embodiment of the present invention can manage each path as an independent path even in a case where, for example, there is a plurality of multilayer paths. This allows the transmitter management system 1 to perform flexible path management such as path management in which the performance and function an operator expects are guaranteed, and finely tuned management of the performance and function.

[Configuration of Abstraction Layer]

An example of the functional configuration of the abstraction layer 20 will be described below.

Figure 2:
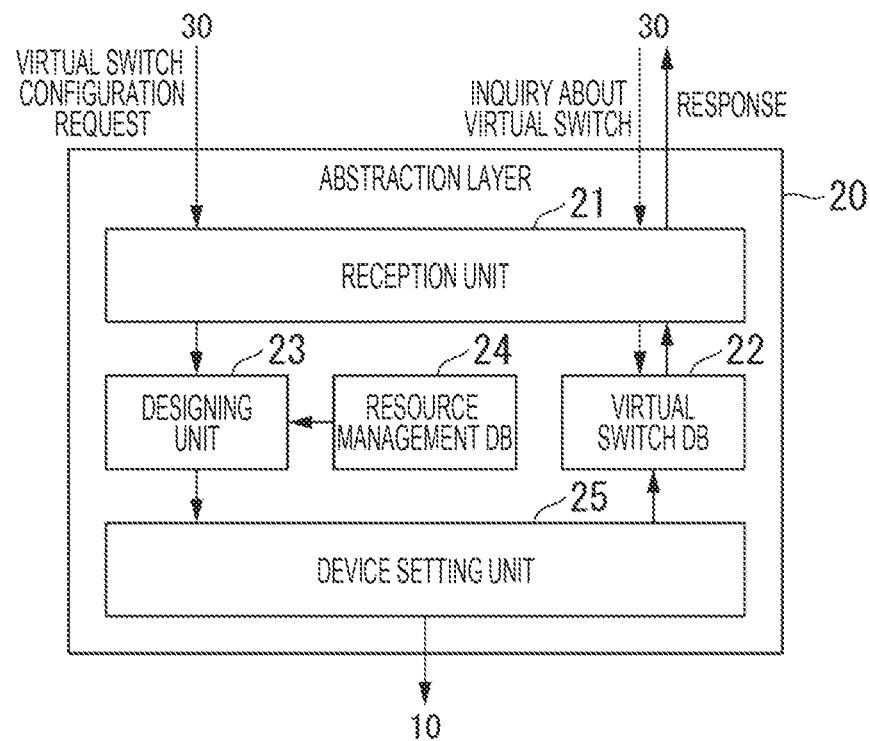
FIG. 2 is a block diagram illustrating a functional configuration of an abstraction layer 20 of the transmitter management system 1 according to the first embodiment of the present invention.

FIG. 2 is a block diagram illustrating the functional configuration of the abstraction layer 20 of the transmitter management system 1 according to the first embodiment of the present invention. As described above, the abstraction layer 20 is constituted by, for example, a server device.

As illustrated in FIG. 2, the abstraction layer 20 includes a reception unit 21, a virtual switch database 22, a designing unit 23, a resource management database 24, and a device setting unit 25. Hereinafter, a "database" may be referred to as a "DB".

The reception unit 21 receives a virtual switch configuration request transmitted from the upper management system 30. The virtual switch configuration request includes information indicating configuration requirements of a communication device requested by a user such as an operator. For example, the virtual switch configuration request includes information regarding configuration requirements of a switch such as the number of ports, performance (e.g., a delay amount, power consumption, or throughput), and functions. The reception unit 21 outputs the acquired virtual switch configuration request to the designing unit 23.

In addition, the reception unit 21 receives an inquiry transmitted from the upper management system 30 about a virtual switch that has already been configured. For example, the reception unit 21 receives an inquiry about a connection status or the like of the virtual switch that has already been configured. The reception unit 21 acquires information regarding the virtual switch that has already been configured that has been recorded in the virtual switch DB 22, and generates information indicating a response to the inquiry. The reception unit 21 transmits, to the upper management system 30, the generated information indicating the response to the inquiry.

The virtual switch DB 22 stores the information regarding the virtual switch that has already been configured. In response to the inquiry from the reception unit 21, the virtual switch DB 22 returns the information regarding the virtual switch that has already been configured to the reception unit 21. The virtual switch DB 22 includes, for example, a storage medium such as a random access memory (RAM), a flash memory, an electrically erasable programmable read only memory (EEPROM), or a hard disk drive (HDD), or a combination of any of these storage media.

The designing unit 23 acquires the virtual switch configuration request output from the reception unit 21. The designing unit 23 designs (determines) multilayer paths in accordance with the configuration requirements of the virtual switch included in the acquired virtual switch configuration request. That is, the designing unit 23 designs a plurality of paths including transfer processing by different optical transmitters (the optical transmitter 11 and the layer 2-4 device 12). The designing unit 23 outputs information indicating the designed paths to the device setting unit 25.

When designing the paths, the designing unit 23 designs the paths on the basis of information indicating resource availability state in the subordinate communication device group 10, the information being recorded in the resource management DB 24. On the basis of the designed paths, the designing unit 23 updates the information indicating the resource availability state in the subordinate communication device group 10, the information being recorded in the resource management DB 24.

The resource management DB 24 stores the information indicating the resource availability state in the subordinate communication device group 10. The resources here are, for example, a wavelength resource, a transfer resource, and the like. The resource management DB 24 includes, for example, a storage medium such as a RAM, a flash memory, an EEPROM, or an HDD, or a combination of any of these storage media.

The device setting unit 25 acquires, from the designing unit 23, the information indicating the paths designed by the designing unit 23. The device setting unit 25 performs a setting for the subordinate communication device group 10 in accordance with the acquired information indicating the paths. That is, the device setting unit 25 performs a setting for the communication device group 10 (the optical transmitter 11, the layer 2-4 device 12, and the like) such that a virtual switch that executes transfer processing on the basis of the paths designed by the designing unit 23 is configured for each path. Thus, virtual switches are configured. The device setting unit 25 records, in the virtual switch DB 22, information regarding the configured virtual switches.

Note that the device setting unit 25 performs a setting for the subordinate communication device group 10 with the use of, for example, an SDN protocol.

[Operation of Transmitter Management System]

An example of an operation of the transmitter management system 1 will be described below.

Figure 3:
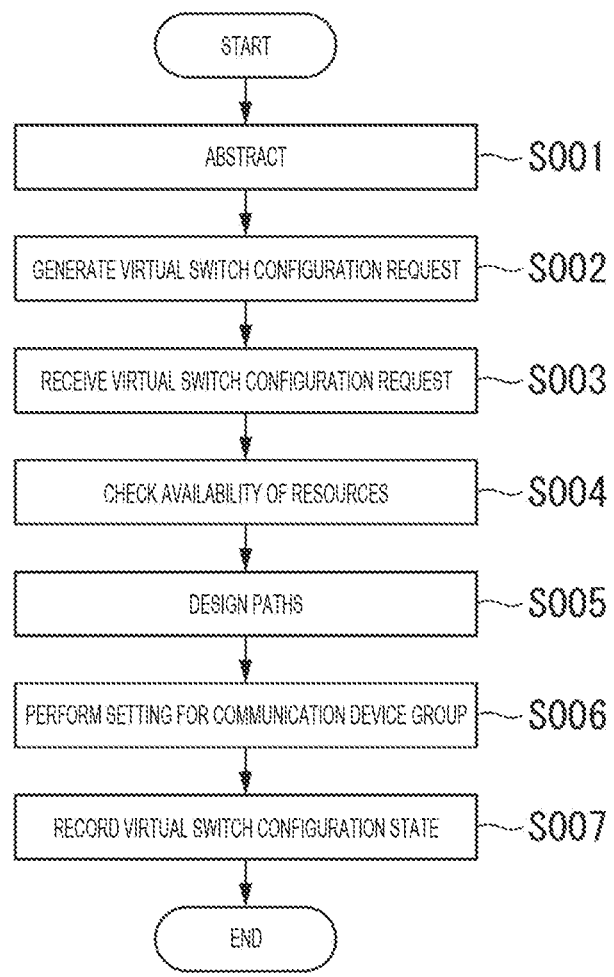
FIG. 3 is a flowchart illustrating an operation of the transmitter management system 1 according to the first embodiment of the present invention.

FIG. 3 is a flowchart illustrating the operation of the transmitter management system 1 according to the first embodiment of the present invention.

The abstraction layer 20 abstracts in advance, as a resource pool, the communication device group 10 including the layer 2-4 device 12 and the optical transmitter 11 as a layer 0/1 device (step S001).

The upper management system 30 generates a virtual switch configuration request (step S002). The upper management system 30 transmits the generated virtual switch configuration request to the abstraction layer 20.

The reception unit 21 of the abstraction layer 20 receives the virtual switch configuration request transmitted from the upper management system 30 (step S003). The reception unit 21 outputs the acquired virtual switch configuration request to the designing unit 23 of the abstraction layer 20.

The designing unit 23 acquires the virtual switch configuration request output from the reception unit 21. The designing unit 23 checks configuration requirements of virtual switches included in the acquired virtual switch configuration request. In addition, the designing unit 23 refers to the information recorded in the resource management DB 24 to check the resource availability state in the subordinate communication device group 10 (step S004).

The designing unit 23 designs (determines) paths on the basis of the configuration requirements of the virtual switches and the resource availability state in the subordinate communication device group 10 (step S005). The designing unit 23 outputs information indicating the designed paths to the device setting unit 25 of the abstraction layer 20.

The device setting unit 25 acquires, from the designing unit 23, the information indicating the paths designed by the designing unit 23. The device setting unit 25 performs a setting for the subordinate communication device group 10 in accordance with the acquired information indicating the paths (step S006). Thus, virtual switches are configured.

The device setting unit 25 records, in the virtual switch DB 22 of the abstraction layer 20, information regarding the configured virtual switches (step S007).

Thus, the operation of the transmitter management system 1 illustrated in the flowchart of FIG. 3 ends.

As described above, the abstraction layer 20 of the transmitter management system 1 according to the first embodiment of the present invention abstracts, as a resource pool, the communication device group 10 including the layer 2-4 device 12 and the optical transmitter 11 as a layer 0/1 device. Then, the abstraction layer 20 reconfigures the resource pool as virtual switches in response to a virtual switch configuration request from the upper management system 30. Then, the abstraction layer 20 provides the upper management system 30 with the configured virtual switches as management targets.

With such a configuration, the transmitter management system 1 according to the first embodiment of the present invention can manage each one of a plurality of multilayer paths as an independent device, and this allows an operator to perform finely tuned performance/function management and path management.

Second Embodiment

A system to which the transmitter management method according to the present invention is applicable is not limited to the transmitter management system 1 in which the optical transmitter 11 and the layer 2-4 device 12 are simply combined as in the first embodiment described above. The transmitter management method according to the present invention is also applicable to, for example, an architecture in which functions of layers 2 to 4 are componentized into a plurality of functional units and the plurality of functional units is combined.

Figure 4:
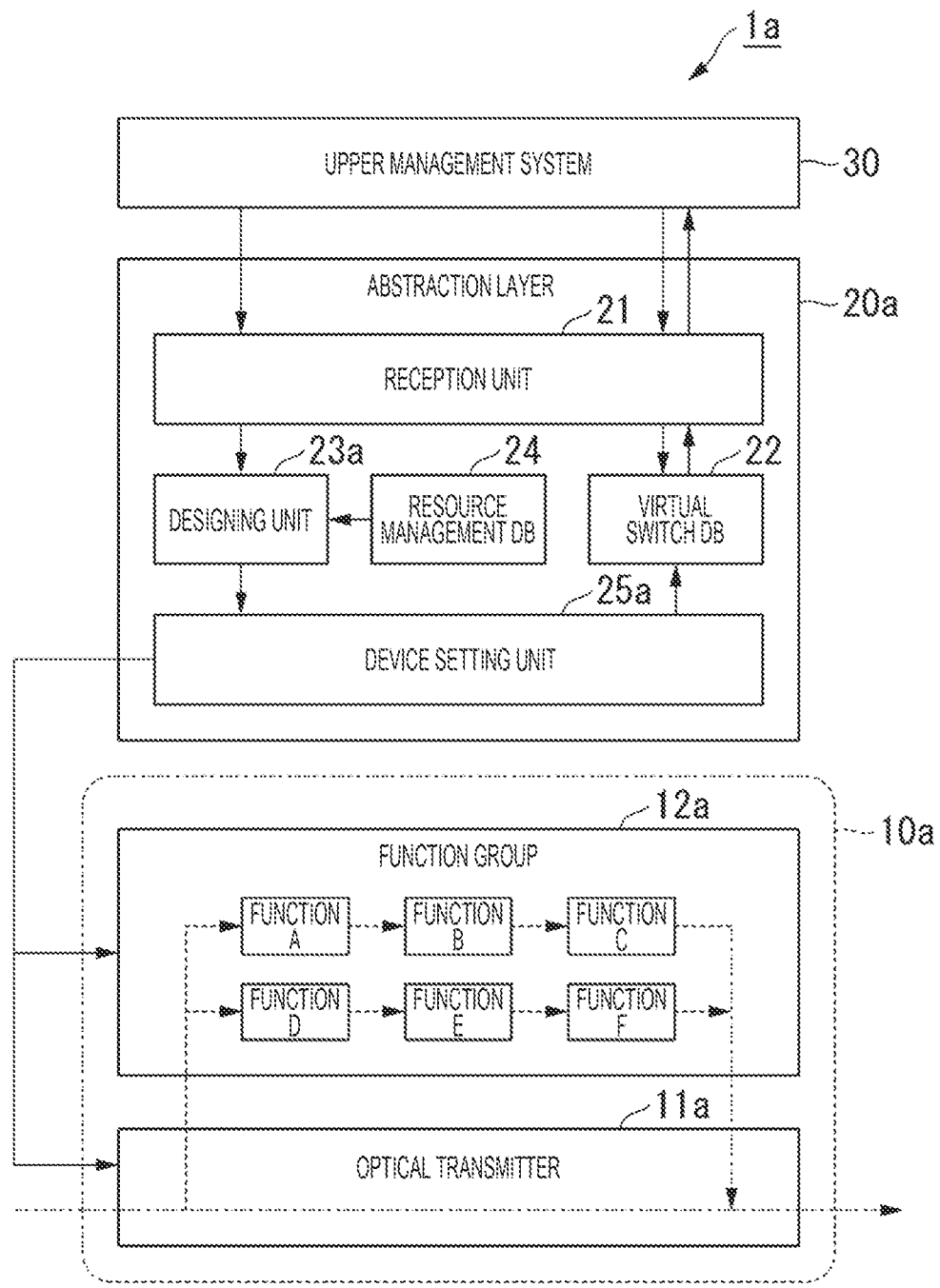
FIG. 4 is a block diagram illustrating a functional configuration of a transmitter management system 1a according to a second embodiment of the present invention.
Figure 5:
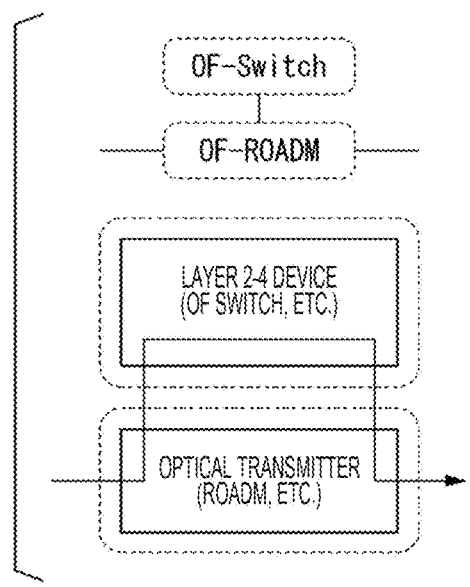
FIG. 5 is a diagram illustrating a conventional technology for abstracting an optical transmitter as a virtual OpenFlow switch.
Figure 6:
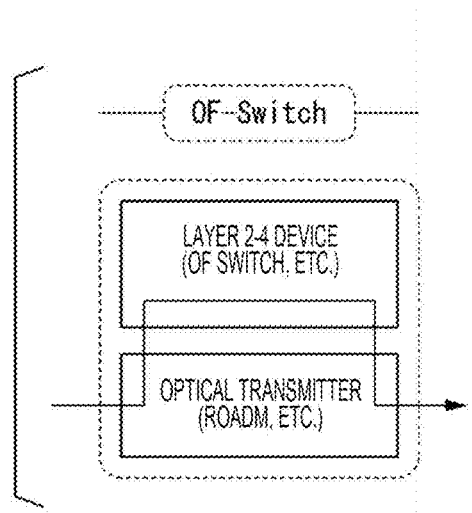
FIG. 6 is a diagram illustrating a conventional multilayer integrated management technique in which an optical transmitter and a packet switch are managed in an integrated manner.
Figure 7:
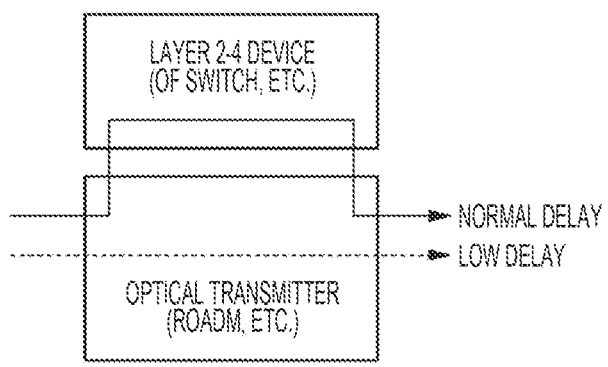
FIG. 7 is a diagram illustrating an example of a case where there is a plurality of paths in transfer processing.

FIG. 4 is a block diagram illustrating the functional configuration of a transmitter management system 1a according to a second embodiment of the present invention. Note that functional units having functions similar to those of functional units included in the transmitter management system 1 according to the first embodiment described above are denoted by the same reference numerals in FIG. 4, and description thereof is omitted.

As illustrated in FIG. 4, the transmitter management system 1a according to the present embodiment includes a communication device group 10a, an abstraction layer 20a, and an upper management system 30.

The communication device group 10a includes an optical transmitter 11a and a function group 12a.

The abstraction layer 20a includes a reception unit 21, a virtual switch DB 22, a designing unit 23a, a resource management DB 24, and a device setting unit 25a.

The function group 12a has an architecture in which a plurality of functional units obtained by componentizing the functions of the layers 2 to 4 can be combined. For example, as illustrated in FIG. 4, the function group 12a according to the present embodiment has six functional units componentized into functions A to F. Each of the componentized functional units has, for example, one of a bridge function, an Internet protocol (IP) routing function, and the like.

The functional units included in the function group 12a may include not only functions belonging to the layers 2 to 4 but also functions belonging to the layer 1 such as an encoding function and a decoding function.

The device setting unit 25a acquires, from the designing unit 23, information indicating paths designed by the designing unit 23. The device setting unit 25a performs a setting for the subordinate communication device group 10a in accordance with the acquired information indicating the paths. Thus, virtual switches are configured. The device setting unit 25a records, in the virtual switch DB 22, information regarding the configured virtual switches.

FIG. 4 illustrates, as an example, a case where there are three paths. The first path is for transfer processing in which the optical transmitter 11a temporarily transfers a received signal to the function group 12a, and the function group 12a performs processing related to the functions A to C on the signal. The second path is for transfer processing in which the optical transmitter 11a temporarily transfers a received signal to the function group 12a, and the function group 12a performs processing related to the functions D to F on the signal. The third path is for transfer processing performed by the optical transmitter 11a alone, without the optical transmitter 11a transferring a received signal to the function group 12a.

The three paths illustrated in FIG. 4 are different in function and performance (e.g., a delay amount, power consumption, or throughput). The plurality of paths having different functions and performances is designed (determined) by the designing unit 23a. The device setting unit 25a performs a setting for the subordinate communication device group 10a in accordance with information indicating the designed paths acquired from the designing unit 23a.

Thus, virtual switches corresponding to the paths are configured. The device setting unit 25 records, in the virtual switch DB 22, information regarding the plurality of configured virtual switches. The information regarding the plurality of configured virtual switches is presented to the upper management system 30 by the reception unit 21.

As described above, the abstraction layer 20a of the transmitter management system 1a according to the second embodiment of the present invention abstracts, as a resource pool, the communication device group 10a including the function group 12a and the optical transmitter 11a as a layer 0/1 device. Then, the abstraction layer 20a reconfigures the resource pool as virtual switches in response to a virtual switch configuration request from the upper management system 30. Then, the abstraction layer 20a provides the upper management system 30 with the configured virtual switches as management targets.

In addition, the abstraction layer 20a of the transmitter management system 1a according to the second embodiment of the present invention can design paths by combining the componentized functional units included in the function group 12a and reconfigure the resource pool as virtual switches.

With such a configuration, the transmitter management system 1a according to the second embodiment of the present invention can manage each one of a plurality of multilayer paths as an independent device, and this allows an operator to perform more finely tuned performance/function management and path management.

According to the above-described embodiments, the transmitter management system includes a plurality of optical transmitters and a transmitter management device. For example, the transmitter management system is the transmitter management systems 1 and 1a in the embodiments, the plurality of optical transmitters is the communication device groups 10 and 10a (that is, the optical transmitters 11 and 11a, the layer 2-4 device 12, and the function group 12a) in the embodiments, and the transmitter management device is a device constituting the abstraction layers 20 and 20a in the embodiments.

The transmitter management device includes a reception unit, a determination unit, and a setting unit. For example, the reception unit is the reception unit 21 in the embodiments, the determination unit is the designing units 23 and 23a in the embodiments, and the setting unit is the device setting units 25 and 25a in the embodiments.

The reception unit receives a virtual switch configuration request from an upper management system. For example, the upper management system is the upper management system 30 in the embodiments. The determination unit determines a plurality of paths including transfer processing by different optical transmitters on the basis of the configuration request received by the reception unit. For example, the plurality of different optical transmitters is the optical transmitters 11 and 11a and the layer 2-4 device 12 in the embodiments. The setting unit performs a setting for the plurality of optical transmitters such that a virtual switch that executes transfer processing on the basis of the plurality of paths determined by the determination unit is configured for each path.

Note that the determination unit may set the plurality of optical transmitters as a resource pool.

Note that the setting unit may perform a setting for a plurality of optical transmitters of layers different from each other. For example, the plurality of optical transmitters of layers different from each other is the communication device group 10 (that is, the optical transmitter 11 and the layer 2-4 device 12) or the communication device group 10a (that is, the optical transmitter 11a and the function group 12a) in the embodiments.

Note that the determination unit may design (determine) a path in which a plurality of componentized functional units is combined. For example, the plurality of functional units is the functions A to F included in the function group 12a in the embodiment.

Note that the determination unit may perform a setting for a plurality of optical transmitters with the use of a software defined networking (SDN) protocol.

The configurations of the transmitter management systems 1 and 1a in the embodiments described above may be partially constituted by a computer. In that case, a program for implementing this function may be recorded in a computer-readable recording medium, and the program recorded in the recording medium may be read and executed by a computer system for implementation of this function. Note that the "computer system" here includes hardware such as an OS and peripheral equipment. The "computer-readable recording medium" refers to a storage device such as a portable medium such as a flexible disk, a magneto-optical disk, a ROM, or a CD-ROM, or a hard disk built in a computer system. Furthermore, the "computer-readable recording medium" may include a medium that dynamically holds a program for a short time, such as a communication line in a case where the program is transmitted via a network such as the Internet or a communication line such as a telephone line, and a medium that holds a program for a certain period of time, such as a volatile memory inside a computer system serving as a server or a client in that case. In addition, the program may be for implementing some of the functions described above, may be capable of implementing the functions described above in combination with a program already recorded in the computer system, or may be achieved with the use of a programmable logic device such as a field programmable gate array (FPGA).

While the embodiments of the present invention have been described above in detail with reference to the drawings, the specific configuration is not limited to the embodiments, and includes design and the like without departing from the scope of the present invention.

REFERENCE SIGNS LIST 1, 1a Transmitter management system
10, 10a Communication device group
11, 11a Optical transmitter
12 Layer 2-4 device
12a Function group
20, 20a Abstraction layer
21 Reception unit
22 Virtual switch DB
23, 23a Designing unit
24 Resource management DB
25, 25a Device setting unit
30 Upper management system

The invention claimed is:

1. A transmitter management device comprising a processor configured to perform operations comprising:
    receiving a virtual switch configuration request from an upper management system;
    determining a plurality of multilayer paths including transfer processing by different network devices on a basis of the virtual switch configuration request, wherein:
        a first multilayer path among the plurality of multilayer paths utilizes a first network device and a second network device that are respectively operating on different layers of a networking framework to perform transfer processing of a received signal; and
        a second multilayer path among the plurality of multilayer paths utilizes only one of the first network device or the second network device to perform transfer processing of the received signal;
    performing a setting for the different network devices in such a way that (i) a first virtual switch that executes transfer processing on a basis of the first path is configured for the first path and (ii) a second virtual switch that executes transfer processing on a basis of the second path is configured for the second path; and
    managing each of the plurality of multilayer paths as an independent path.

2. The transmitter management device according to claim 1, wherein
    the processor is configured to set a plurality of optical transmitters as a resource pool.

3. The transmitter management device according to claim 1, wherein
    the processor is configured to perform a setting for a plurality of optical transmitters of layers different from each other.

4. The transmitter management device according to claim 1, wherein
    the processor is configured to determine a path in which a plurality of componentized functional units is combined.

5. The transmitter management device according to claim 1, wherein
    the processor is configured to perform a setting for a plurality of optical transmitters by using a software defined networking protocol.

6. A transmitter management system comprising a plurality of different network devices and a transmitter management device, the transmitter management device comprising a processor configured to perform operations comprising:
    receiving a virtual switch configuration request from an upper management system;
    determining a plurality of multilayer paths including transfer processing by the plurality of different network devices on a basis of the virtual switch configuration request, wherein:
        a first multilayer path among the plurality of multilayer paths utilizes a first network device and a second network device that are respectively operating on different layers of a networking framework to perform transfer processing of a received signal; and
        a second multilayer path among the plurality of multilayer paths utilizes only one of the first network device or the second network device to perform transfer processing of the received signal;
    performing a setting for the different network devices in such a way that (i) a first virtual switch that executes transfer processing on a basis of the first path is configured for the first path and (ii) a second virtual switch that executes transfer processing on a basis of the second path is configured for the second path; and managing each of the plurality of multilayer paths as an independent path.

7. A transmitter management method comprising:

receiving a virtual switch configuration request from an upper management system;

determining a plurality of multilayer paths including transfer processing by a plurality of different network devices on a basis of the virtual switch configuration request, wherein:
- a first multilayer path among the plurality of multilayer paths utilizes a first network device and a second network device that are respectively operating on different layers of a networking framework to perform transfer processing of a received signal; and
- a second multilayer path among the plurality of multilayer paths utilizes only one of the first network device or the second network device to perform transfer processing of the received signal;

performing a setting for the plurality of different network devices in such a way that (i) a first virtual switch that executes transfer processing on a basis of the first path is configured for the first path and (ii) a second virtual switch that executes transfer processing on a basis of the second path is configured for the second path; and managing each of the plurality of multilayer paths as an independent path.

* * * * *